(12) United States Patent
Kotani et al.

(10) Patent No.: US 9,467,448 B2
(45) Date of Patent: Oct. 11, 2016

(54) CONSIGNING AUTHENTICATION METHOD (75) Inventors: Seigo Kotani, Sunnyvale, CA (US); Masaaki Matsuguchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 12/824,284

(22) Filed: Jun. 28, 2010

(65) Prior Publication Data
US 2011/0321134 A1 Dec. 29, 2011

(51) Int. Cl.
G06F 15/16 (2006.01)
H04L 29/06 (2006.01)
G06F 21/10 (2013.01)

(52) U.S. Cl.
CPC .............. *H04L 63/10* (2013.01); *G06F 21/10* (2013.01); *H04L 63/126* (2013.01); *H04L 63/20* (2013.01)

(58) Field of Classification Search
USPC .......................................................... 713/176
See application file for complete search history.

(56) References Cited

U.S. PATENT DOCUMENTS

| | | | |
|---|---|---|---|
| 7,117,529 B1* | 10/2006 | O'Donnell et al. ............... | 726/6 |
| 7,194,761 B1* | 3/2007 | Champagne ....................... | 726/6 |
| 7,600,262 B2* | 10/2009 | Nomura ........................... | 726/27 |
| 8,019,871 B2* | 9/2011 | Milojicic ........................ | 709/226 |
| 8,050,676 B2 | 11/2011 | Yabe et al. | |
| 8,166,564 B2* | 4/2012 | Nomura ........................... | 726/27 |
| 2002/0128939 A1* | 9/2002 | Tarrant ............................ | 705/35 |
| 2003/0009522 A1* | 1/2003 | Rau ........................ | G06Q 10/10 709/205 |
| 2003/0028639 A1* | 2/2003 | Yamamoto et al. ........... | 709/225 |
| 2003/0105812 A1* | 6/2003 | Flowers et al. ................ | 709/203 |
| 2003/0120611 A1* | 6/2003 | Yoshino et al. ................. | 705/67 |
| 2003/0130947 A1* | 7/2003 | Benantar .......................... | 705/44 |
| 2003/0177246 A1* | 9/2003 | Goodman et al. ............. | 709/228 |
| 2004/0003247 A1* | 1/2004 | Fraser et al. ................... | 713/169 |
| 2004/0030930 A1 | 2/2004 | Nomura | |
| 2004/0054905 A1* | 3/2004 | Reader ........................... | 713/171 |

(Continued)

FOREIGN PATENT DOCUMENTS

| | | | | |
|---|---|---|---|---|
| CN | 1479896 | 3/2004 | ............. | G06F 13/00 |
| JP | 2008-123290 | 5/2008 | ............. | G06F 21/00 |

(Continued)

OTHER PUBLICATIONS

Breivik, WO 03/040898 A1, Nov. 8, 2001, pp. All (incorporated herein).*

(Continued)

*Primary Examiner* — Andrew Goldberg
(74) *Attorney, Agent, or Firm* — Baker Botts L.L.P.

(57) ABSTRACT

A method for sharing content between clients at a common trust level in a trust hierarchy associated with a network implementing policy-based management includes receiving integrity information from a first client at a first trust level in the trust hierarchy at a second client at the first trust level, requesting permission to receive electronic content from the first client, receiving a determination regarding the requested permission, and communicating the determination to the first client. The first client obtained content from a policy enforcement point in the network. The request for permission is made to the policy enforcement point and the request includes the integrity information. The determination is received from the policy enforcement point and is based in part on the integrity information about the first client. The second client communicates to the first client the determination of whether the second client receives the content from the first client.

8 Claims, 4 Drawing Sheets

(56) References Cited

U.S. PATENT DOCUMENTS

| | | | |
|---|---|---|---|
| 2004/0117818 A1* | 6/2004 | Karaoguz et al. | 725/31 |
| 2005/0060542 A1* | 3/2005 | Risan et al. | 713/165 |
| 2005/0278541 A1* | 12/2005 | See et al. | 713/182 |
| 2006/0005036 A1* | 1/2006 | Hu et al. | 713/182 |
| 2006/0020960 A1* | 1/2006 | Relan et al. | 725/30 |
| 2006/0095505 A1* | 5/2006 | Zimmer et al. | 709/203 |
| 2007/0240203 A1* | 10/2007 | Beck | 726/4 |
| 2007/0283142 A1* | 12/2007 | Milstein et al. | 713/155 |
| 2008/0086646 A1* | 4/2008 | Pizano | 713/189 |
| 2008/0148349 A1* | 6/2008 | Stevens et al. | 726/2 |
| 2009/0138576 A1* | 5/2009 | Sekimoto et al. | 709/219 |
| 2009/0217359 A1* | 8/2009 | Kikkawa et al. | 726/5 |
| 2009/0319611 A1* | 12/2009 | Turakhia | 709/204 |
| 2010/0281520 A1* | 11/2010 | Deguchi | 726/3 |
| 2010/0318784 A1* | 12/2010 | Rao et al. | 713/151 |
| 2011/0010433 A1* | 1/2011 | Wilburn et al. | 709/219 |
| 2011/0277022 A1* | 11/2011 | Weizman | 726/7 |
| 2012/0009902 A2* | 1/2012 | Peterson et al. | 455/412.1 |

FOREIGN PATENT DOCUMENTS

| | | | |
|---|---|---|---|
| WO | WO 03/040898 | 5/2003 | G06F 1/00 |
| WO | WO 2009/021200 | 2/2009 | G06F 15/16 |

OTHER PUBLICATIONS

International Search Report and Written Opinion; PCT/IB2011/001421; pp. 10, Dec. 12, 2011.
Japanese Office Action and English translation; Application No. 2013-517565; pp. 5, Apr. 22, 2014.
Japanese Office Action and English translation; Application No. 2013-517565; pp. 5, Dec. 10, 2013.
Chinese Office Action with English translation; Application No. 201180032282.8; pp. 18, Aug. 26, 2014.
Chinese Office Action with English translation; Application No. 201180032282.8; pp. 18 with English Translation, May 21, 2015.

* cited by examiner

CONSIGNING AUTHENTICATION METHOD

TECHNICAL FIELD OF THE INVENTION

The present invention relates generally to consigning authentication methods in a distributed communication network, and more particularly to a method and system for sharing content between entities at similar trust levels in a trust hierarchy.

BACKGROUND

Distributed communication networks include a wide range of systems, from private intranets to the unsecured Internet. In any communication network, electronic content flows from one point in the network to another. Electronic content, in this context, may include electronic documents, executable files, data files, etc. In some communication networks, access to the electronic content may be restricted and/or limited to particular users and/or clients. Several methods exist to verify the identity of a user attempting to gain access to electronic content, such as username and password combinations, public/private key combinations, and/or biometrics. In some networks, a central server may employ such methods before distributing electronic content to a requesting user and/or client.

No matter how robust the verification scheme, however, once the electronic content has passed to the user, the central server may not have control over further dissemination. As more and more electronic content is stored remotely and access to that data through various services becomes increasingly important, it will become correspondingly important to protect access to the content. Methods and systems for checking, authorizing, tracking, and/or tracing content transfer after it leaves the server may prove increasingly valuable.

SUMMARY OF THE DISCLOSURE

The present disclosure provides a method and system for distributing electronic content that substantially eliminates or reduces at least some of the disadvantages and problems associated with previous methods and systems.

According to one embodiment, a method for sharing electronic content between clients at a common trust level in a trust hierarchy associated with a network implementing policy-based management may include receiving a first request for delivery of the electronic content, approving the delivery, delivering the electronic content, receiving a second request for permission to receive the electronic content, determining whether to grant the second request, and communicating the determination. The first request may be received from a first client at a first trust level in the trust hierarchy. Approving the delivery of the electronic content to the first client may be at a policy enforcement point in the network and may be based at least in part on the first trust level in the trust hierarchy. The electronic content may be delivered to the first client. The second request may be received from a second client at the first trust level in the trust hierarchy. The second request may be for permission to receive the electronic content from the first client and may include integrity information about the first client. Determining whether to allow the second client to receive the electronic content from the first client may be based at least in part on the integrity information about the first client. Communicating to the second client may include the determination of whether the second client may receive the electronic content from the first client.

According to another embodiment, a method for sharing content between clients at a common trust level in a trust hierarchy associated with a network implementing policy-based management may include receiving integrity information from a first client at a first trust level in the trust hierarchy at a second client at the first trust level, requesting permission to receive electronic content from the first client, receiving a determination regarding the requested permission, and communicating the determination to the first client. The first client may have obtained content from a policy enforcement point in the network. The request for permission may be made to the policy enforcement point and the request may include the integrity information regarding the first client. The determination may be received from the policy enforcement point and may be based at least in part on the integrity information about the first client. The second client may communicate to the first client the determination of whether the second client may receive the content from the first client.

According to another embodiment, a network system for sharing electronic content among clients at a common trust level in a trust hierarchy and implementing policy-based management may include a plurality of clients, a storage unit, a policy enforcement point, and a policy decision point. The plurality of clients may each have a respective trust level in the trust hierarchy. The storage unit may be configured to deliver electronic content to the plurality of clients. The policy enforcement point may be in electronic communication with the storage unit and a first one of the plurality of clients. The policy enforcement point may be configured to receive a first request from the first one of the plurality of clients for the delivery of electronic content from the storage unit. The policy decision point may be in electronic communication with the policy enforcement point. The policy decision point may be configured to assess the first one of the plurality of clients including assessing at least the trust level of the first one of the plurality of clients and to grant permission to the policy enforcement point to deliver the content from the storage unit to the first one of the plurality of clients. The policy enforcement point may be further configured to receive from a second one of the plurality of clients a second request for permission to receive the electronic content from the first one of the plurality of clients. The second request may include at least integrity information associated with the first one of the plurality of clients. The policy decision point may be further configured to make a policy-based decision whether to allow the second one of the plurality of clients to receive the electronic content from the first one of the plurality of clients based at least in part on the integrity information associated with the first one of the plurality of clients.

Technical advantages of certain embodiments of the present disclosure include providing methods for allowing direct transfer of electronic content between clients without connecting both clients to a server. The methods may include checking and/or authorizing the transfer based on characteristics of the respective clients. The methods may include tracking and/or tracing the transfer of electronic content after it has been delivered from the server. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
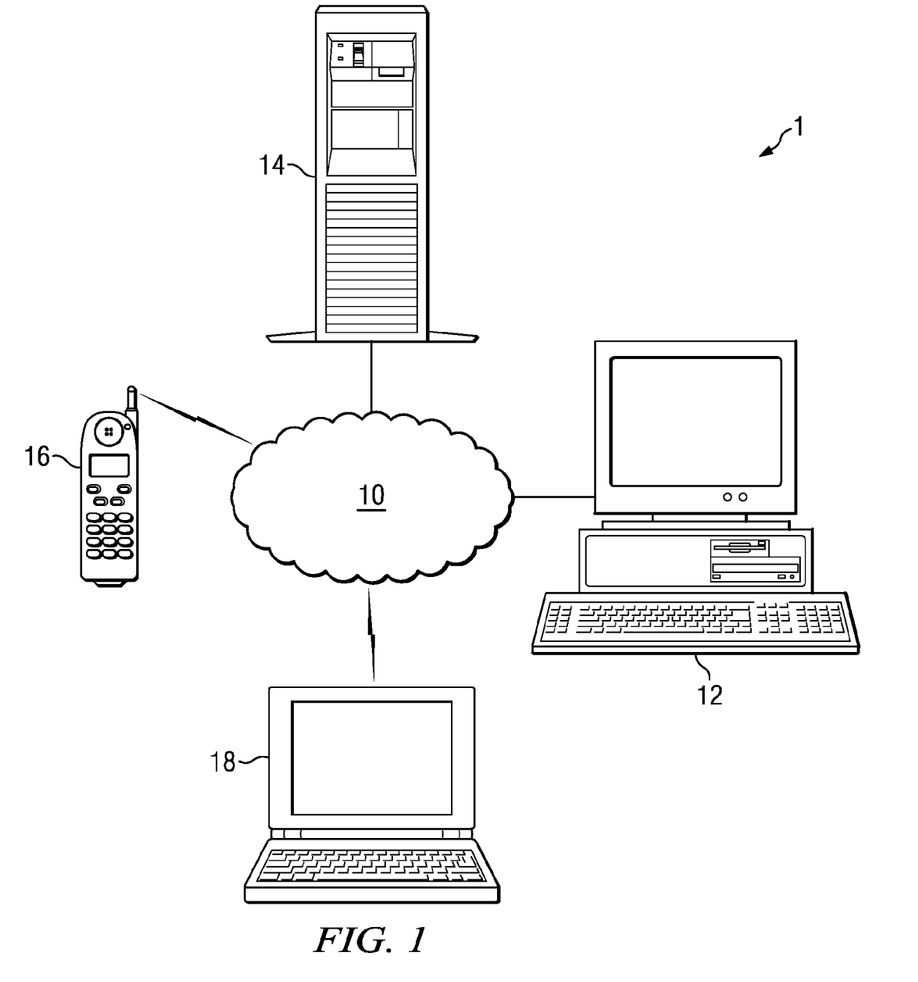
FIG. 1 shows an example communication network including clients and a server, in accordance with teachings of the present disclosure.

Preferred embodiments and their advantages are best understood by reference to FIGS. 1 through 7, wherein like numbers are used to indicate like and corresponding parts. FIG. 1 shows a simplified representation of an example communication network 1, in accordance with the teachings of the present disclosure. Communication network 1 may include a network 10, a server 12, a storage unit 14, and clients 16 and 18. Clients 16 and 18 may include a variety of users requesting access to electronic content accessible by server 12 and/or stored in storage unit 14.

For purposes of this disclosure, "electronic content" or "content" may include any file, files, object code, executable code, data records, or any other electronically recorded data structure that a client of a communication network may wish to access. Illustrative examples may include text files, spreadsheets, email, medical records, images, and other electronic data, as well as web pages, private networks, word processing programs, file management systems, and other programs. Additionally, a "client" may refer to a person acting as an end user or to the device or devices used by such a person to access the communication network, such as a personal computer, kiosk, or mobile computing device.

As illustrated, network 10 may include any network capable of transmitting audio and/or video telecommunication signals, data, and/or messages. Some examples may include all, or a portion of, a radio access network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any combination of the preceding.

In operation, network 10 may provide connectivity between components coupled to network 10 using any appropriate communication protocol. To facilitate the described communication capabilities, network 10 may include routers, hubs, switches, gateways, call controllers, and/or any other suitable components in any suitable form or arrangement. Additionally, network 10 may include any hardware and/or software configured to communicate information in the form of packets, cells, frames, segments or other portions of data. Although network 10 is illustrated as a single network, communication network 10 may comprise any number or configuration of networks. Moreover, certain embodiments of communication network 1 may include any number or configuration of network 10.

In some embodiments, network 10 may include a virtual private network (VPN). A VPN provides increased security over an open and/or public network. In general, a VPN segregates and/or encapsulates data transfers so that the data may be kept private and/or secure from other devices sharing a intervening network (e.g., a LAN or a WAN). In operation a VPN may allow a plurality of clients 16, 18 to interact with a server 12 as if connected directly and/or privately.

Clients 16 and 18 may represent any suitable combination of hardware, software, and/or encoded logic to provide communication services to a user. Among other things, clients 16, 18 may represent an information kiosk; telephone; cell phone; personal digital assistant (PDA); computer running telephony, e-mail, or other forms of messaging and/or communication software; or any other communication hardware, software, and/or encoded logic that supports communication of voice, video, text or other forms of data using identity communication network 1.

Server 12 may represent a trusted, dedicated server that manages security policies and authenticates attributes. Server 12 may contain a database containing a number of policies defining a set of attribute values that must be met before a client 16, 18 is granted permission to access a resource of storage unit 14 (e.g., electronic content). Server 12 may receive an attribute report from clients 16, 18 identifying one or more attributes associated with clients 16, 18. After authenticating the attributes, server 12 may notify storage unit 14 whether storage unit 14 should provide the requested service to clients 16, 18. Application of such attribute report and authentication may also be referred to as "policy-based management." In some embodiments, server 12 and/or the associated PDP may make this determination based at least on context data specific to client 16, 18. The context data may include data representative of client 16, 18 such as physical location (e.g., IP address), certain software installed on the requesting machine (e.g., rigorous antivirus software), biometric identifiers, or any other appropriate context attributes of client 16, 18.

In some embodiments, the attributes considered by server 12 may include a trust level indicating the relative trustworthiness of a client 16, 18 in a trust hierarchy. A "trust hierarchy" may refer to a protection scheme to protect data and function of network resources from both faults and malicious behavior. One example of a trust hierarchy may be referred to as "protection rings." In a trust hierarchy, server 12 may provide varying levels of access to various clients 16, 18, depending on the trust level assigned to the respective client 16, 18. A higher trust level, for example, may allow more access to electronic content and/or privileges to upload, edit, and/or control electronic content and/or components of communication network 1. Server 12 may evaluate and/or issue decisions regarding whether to allow a client 16, 18 to access particular electronic content at a policy decision point (PDP). Server 12 may include a policy enforcement point (PEP) which receives a client's access request and enforces any decision made by the PDP.

Storage unit 14 may include any combination of hardware and software, including controlling logic, for providing access to one or more electronic content to a client 16, 18. For example, storage unit 14 may include a centralized repository of documents, such as medical records. As another example, storage unit 14 may represent an application service provider which provides access to particular applications, software or other media over a network. Such applications, software, or media may include, among other things, document readers, web browsers, or document editing software. As another example, storage unit 14 may be associated with an online networking website or an Email provider.

For clarity of description, FIG. 1 depicts server 12 and storage unit 14 as separate components. In some embodiments, server 12 and storage unit 14 may include standalone software programs stored on computer-readable media and executable by one or more processors associated with one or more computers and/or servers. However, server 12 and storage unit 14 may also include components or subroutines of a larger software program, hard-coded into computer-readable media, and/or any hardware or software modules configured to perform the desired functions.

Figure 2:
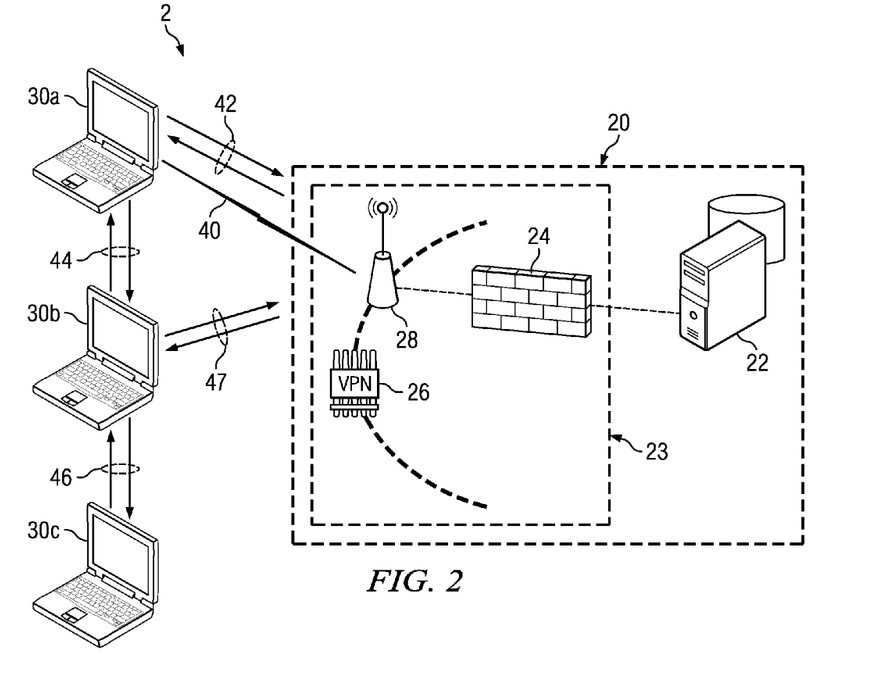
FIG. 2 shows an example communication network, including the flow of information and electronic content, in accordance with teachings of the present disclosure.

FIG. 2 shows an example communication network 2, including the flow of information and electronic content, in accordance with teachings of the present disclosure. Communication network 2 may include server 20, clients 30, and network connection 40. Server 20 may include a policy decision point (PDP) 22 and a policy enforcement point (PEP) 23.

Server 20 may include any device, feature, and/or component of communication network 2 configured to provide services to one or more clients 30. For example, server 20 may communicate with one or more clients 30, store electronic content, and/or distribute electronic content to the one or more clients 30. Server 20 may include any combination of hardware and/or software (e.g., a processor, a memory, and/or other computing resources).

PDP 22 may include any device, feature, and/or component of server 20 configured to evaluate and/or issue decisions regarding whether to allow a client 30 to access particular electronic content. PDP 22 may apply a set of predefined criteria to client 30 to evaluate the decision. PDP 22 may include any combination of hardware and/or software.

PEP 23 may include any device, feature, and/or component of server 20 configured to receive a client's 30 access request and enforce any decision made by the PDP. PEP 23 may include any combination of hardware and/or software. For example, as shown in FIG. 2, PEP 23 may include a firewall 24, a VPN 26, and/or a node 28.

Firewall 24 may include any device, component, and/or feature of server 20 configured to block unauthorized access and permit authorized communications and/or access. Firewall 24 may apply any appropriate set of rules and/or criteria to implement the authorization scheme. Firewall 24 may be implemented in hardware, software, and/or a combination of both. For example, firewall 24 may prevent unauthorized users of the Internet from accessing a private network connected to the Internet. In some embodiments, firewall 24 may apply the decisions made by PDP 22.

Node 28 may include any device, component, and/or feature of PEP 23 configured to provide a connection between server 20 and one or more clients 30. Node 28 may be configured to send, receive, and/or forward data between server 20 and one or more clients 30. For example, node 28 may include a modem, a hub, a bridge, a switch, a host computer, a WLAN access point, etc. Node 28 may be configured to communicate with one or more clients 30 over network connection 40.

Clients 30 may be any suitable combination of hardware, software, and/or encoded logic to provide communication services to a user. For example, client 30 may include an information kiosk, telephone, cell phone, personal digital assistant (PDA), computer running telephony, e-mail, or other forms of messaging and/or communication software, or any other communication hardware, software, and/or encoded logic that supports communication of voice, video, text or other forms of data using communication network 2. In some embodiments, client 30 may include a desktop computer, a portable computer, a notebook computer, and/or a terminal.

In operation, a first client 30a may request, purchase, and/or receive delivery of electronic content directly from server 20, shown at arrows 42. A second client 30b may require and/or desire the same electronic content previously delivered to the first client 30a. Once first client 30a has received the requested electronic content, it may be cheaper, quicker, and/or otherwise preferable to distribute the requested electronic content directly from first client 30a to second client 30b without resending the requested electronic content directly from server 20. Allowing the transmission of the requested electronic content between various clients 30, however, may reduce the security of the electronic content, allow piracy and/or unauthorized access to the electronic content, and/or otherwise compromise the integrity of the electronic content. Direct transfer of requested electronic content may be checked, authorized, tracked, and/or traced using the methods and systems taught in the present disclosure.

As shown in FIG. 2, second client 30b may request the electronic content from first client 30a, shown at arrows 44. First client 30a may be required to receive permission from server 20 to send the requested electronic content to second client 30b. First client 30a may send a request to PEP 23, including relevant information regarding first client 30a, second client 30b, or both. PDP 22 may determine whether to allow first client 30a to deliver the requested electronic content to second client 30b. PDP 22 may consider various information related to second client 30b (e.g., integrity information, trust level, etc.). If PDP 22 determines first client 30a is allowed to deliver the electronic content directly to second client 30b, PEP 23 may communicate that permission to first client 30a. First client 30a may then deliver the requested electronic content to second client 30b.

In another embodiment implementing the teachings of the present disclosure, a third client 30c may request the electronic content from second client 30b, communicating at arrows 46. Second client 30b may request permission from PEP 23 as shown by arrows 47, including relevant information regarding first client 30a, second client 30b, third client 30b, or any combination of the three. PDP 22 may determine whether to allow second client 30b to deliver the requested electronic content to third client 30c. PDP 22 may consider various information related to third client 30c (e.g., integrity information, trust level, etc.). If PDP 22 determines second client 30b is allowed to deliver the electronic content directly to third client 30c, PEP 23 may communicate that permission to second client 30b. Second client 30b may then deliver the requested electronic content to third client 30c. This method may be replicated in total or in part for as many clients 30 as appropriate.

First client 30a may obtain and/or verify integrity information related to second client 30b at any point in the processes described herein. In one example embodiment, first client 30a may obtain and/or verify integrity information related to second client 30b prior to communicating and/or delivering any electronic content and/or other data. First client 30a may retain a record of any integrity information obtained and/or verified. Integrity information may be identified by including a timestamp, identifiers for first client 30a and/or 30b, etc. The integrity information may be referenced by first client 30a and/or server 20 for a variety of purposes. For example, server 20 may request that first client 30a verify that second client 30b was an appropriate recipient of the electronic content, may compile a list of all clients 30 having received the electronic content, etc.

Figure 3:
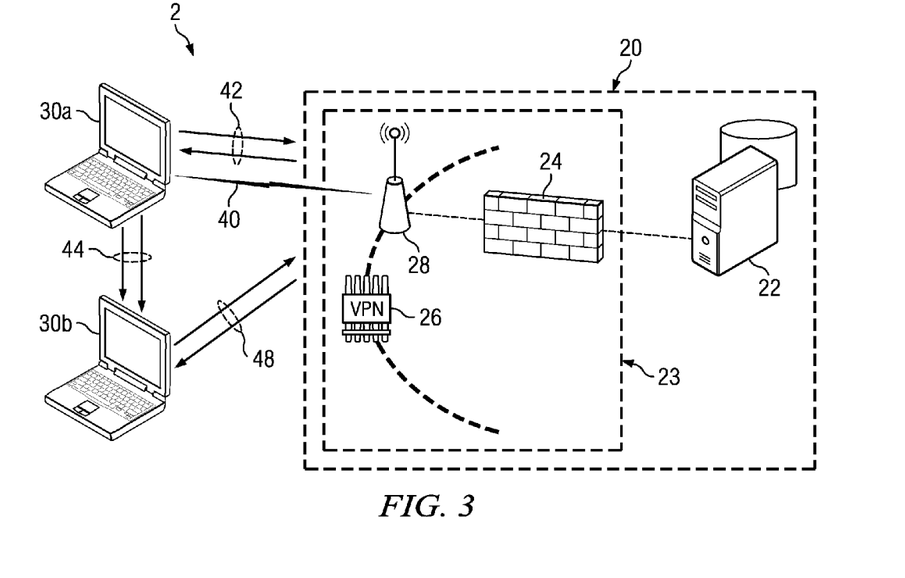
FIG. 3 shows an example communication network, including the flow of information and electronic content, in accordance with teachings of the present disclosure.

FIG. 3 shows another example flow in communication network 2, in accordance with teachings of the present disclosure. Second client 30b may request the electronic content from PEP 23 of server 20, shown at arrows 48. PDP 22 of server 20 may grant second client 30b permission to receive the requested electronic content directly from first client 30a, rather than from server 20. The request sent at 46 may include various data related to first client 30a, second client 30b, or both. PDP 22 may determine whether to allow first client 30a to deliver the requested electronic content to second client 30b. PDP 22 may consider various information related to second client 30b (e.g., integrity information, trust level, etc.). If PDP 22 determines first client 30a is allowed to deliver the electronic content directly to second client 30b, PEP 23 may communicate that permission to first client 30a. First client 30a may then deliver the requested electronic content to second client 30b.

In the schemes shown in FIGS. 2 and 3, PDP 22 may use any appropriate logic, algorithm, and/or routine to make a decision regarding the direct transfer of the requested electronic content between clients 30a and 30b. PDP 22 may consider data representative of clients 30a and 30b such as association with a entity (e.g., a customer), physical location (e.g., IP address), certain software installed on the requesting machine (e.g., required antivirus software), biometric identifiers, or any other appropriate attributes of client 30. The request sent at arrows 44 and/or 46 may include any or all of this data related to first client 30a, second client 30b, or both. In some embodiments, first client 30a and second client 30b may be assigned the same trust level in a trust hierarchy employed by PDP 22.

Figure 4:
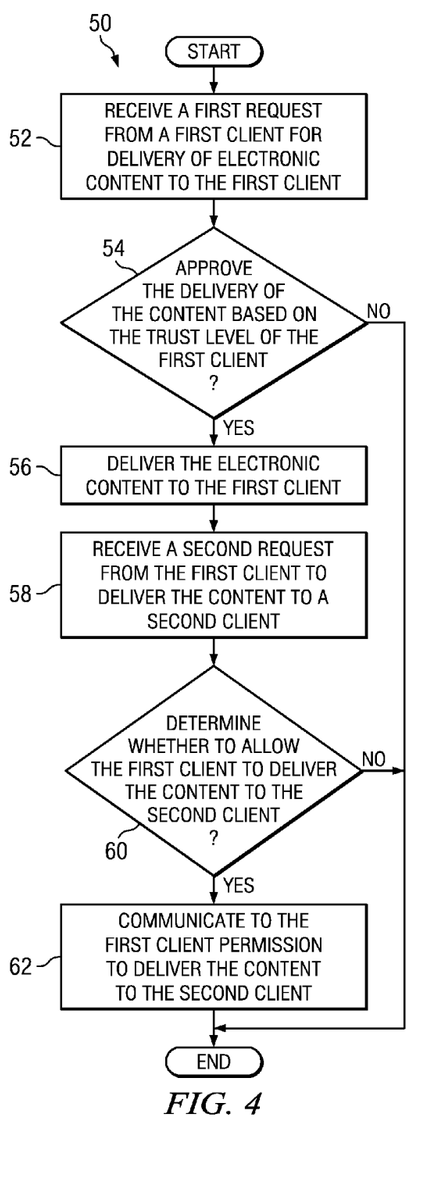
FIG. 4 illustrates a flow chart of an example method for sharing content between clients in a communication network, in accordance with certain embodiments of the present disclosure.

FIG. 4 illustrates a flow chart of an example method 50 for sharing content between clients 30 in a communication network 2, in accordance with certain embodiments of the present disclosure. Method 50 may be performed by a server 20, a PEP 23 associated with a server 20, a PDP 22 associated with a server 20, and/or another component, device, and/or feature of communication network 2. In the following section, method 50 may be described as if performed by PEP 23 and/or PDP 22 associated with server 20, but that description does not limit the application of the teachings of the present disclosure.

At step 52, PEP 23 may receive a first request from a first client 30a for delivery of electronic content to the first client 30a. PEP 23 may receive the first request over a VPN, the Internet, email, and/or any other appropriate communication link with first client 30a.

At step 54, PDP 22 may decide whether to approve the delivery of the electronic content to the first client 30a based at least in part on the trust level associated with the first client 30a. As described above, communication network 2 may include a trust-based hierarchy assigning various trust levels to clients 30, internal users, and/or other components and/or users of communication network 2. If PDP 22 determines that first client 30a is not approved, method 50 may end.

At step 56, PEP 23 may deliver the electronic content to first client 30a based on the permission granted by PDP 22. The electronic content may be delivered by any appropriate method.

At step 58, PEP 23 may receive a second request from first client 30a requesting permission to deliver the electronic content directly from first client 30a to second client 30b. The second request may include any appropriate and/or required data related to first client 30a, second client 30b, or both. As discussed above, the data may include the trust level of each client, integrity information related to either or both, etc.

At step 60, PDP 22 may decide whether to grant permission for first client 30a to deliver the requested electronic content directly to second client 30b. The decision may be based at least in part on the data included in the second request. For example, PDP 22 may base the decision at least in part on the trust level of second client 30b and/or integrity information related to second client 30b. If PDP 22 determines the second request is not approved, method 50 may end.

At step 62, PEP 23 may communicate to first client 30a that first client 30a has permission to deliver the requested electronic content to second client 30b. At the same time, PEP 23 and/or PDP 22 may impose one or more conditions on the delivery of the requested electronic content. For example, the use of the electronic content by second client 30b may be restricted. As another example, second client 30b may be granted a specific and/or limited number of times the electronic content may be accessed. As another example, second client 30b may be granted permission to access the requested electronic content only during a pre-defined period of time. As another example, second client 30b may be limited and/or prohibited from delivering the requested electronic content to other clients.

Figure 5:
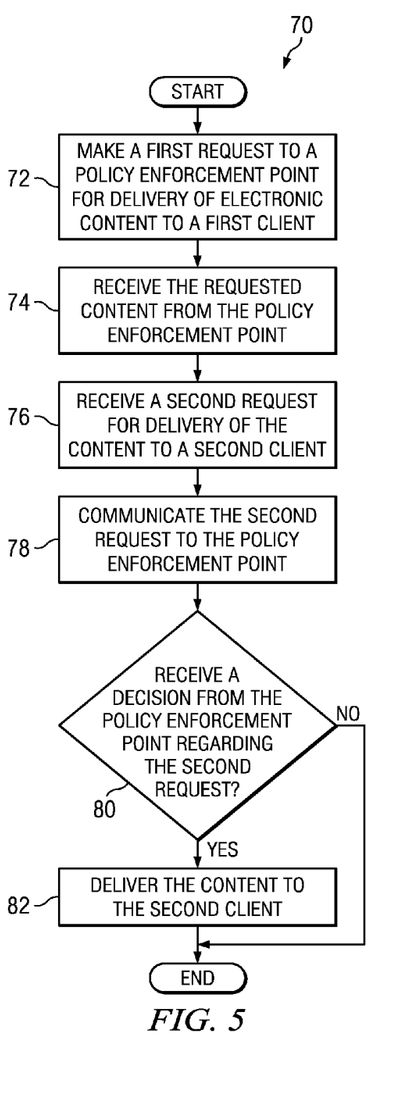
FIG. 5 illustrates a flow chart of an example method for sharing content between clients in a communication network, in accordance with certain embodiments of the present disclosure.

FIG. 5 illustrates a flow chart of an example method 70 for sharing content between clients 30 in a communication network 2, in accordance with certain embodiments of the present disclosure. Method 70 may be performed by a client 30, a server 20, and/or another component, device, and/or feature of communication network 2. In the following section, method 70 may be described as if performed by a first client 30a associated with communication network 2, but that description does not limit the application of the teachings of the present disclosure.

At step 72, first client 30a may make a first request to PEP 23 associated with server 20 for delivery of electronic content to first client 30a. First client 30a may send the first request over a VPN, the Internet, email, and/or any other appropriate communication link with PEP 23. The first request may include any appropriate and/or required data related to first client 30a. As discussed above, the data may include the trust level of first client 30a, integrity information related to first client 30a, etc.

At step 74, first client 30a may receive the requested electronic content from PEP 23 and/or server 20. The requested electronic content may be delivered by any appropriate method and/or system.

At step 76, first client 30a may receive a second request from second client 30b, requesting delivery of the electronic content directly from first client 30a. The second request may include any appropriate and/or required data related to second client 30b. As discussed above, the data may include the trust level of second client 30b, integrity information related to second client 30a, etc.

At step 78, first client 30a may communicate the second request to PEP 23 associated with server 20. First client 30a may add information to the second request. For example the second request may include any appropriate and/or required data related to first client 30a. As discussed above, the data may include the trust level of first client 30a, integrity information related to first client 30a, etc.

At step 80, first client 30a may receive a decision from PEP 23 regarding the second request. If the decision is no, method 70 may end. If the decision is yes, method 70 may proceed to step 82.

At step 82, first client 30a may deliver the requested electronic content to second client 30b. The requested electronic content may be delivered by any appropriate method and/or system. At the same time, PEP 23 and/or PDP 22 may have imposed one or more conditions on the delivery of the requested electronic content. For example, the use of the electronic content by second client 30b may be restricted. As another example, second client 30b may be granted a specific and/or limited number of times the electronic content may be accessed. As another example, second client 30b may be granted permission to access the requested electronic content only during a predefined period of time. As another example, second client 30b may be limited and/or prohibited from delivering the requested electronic content to other clients.

Figure 6:
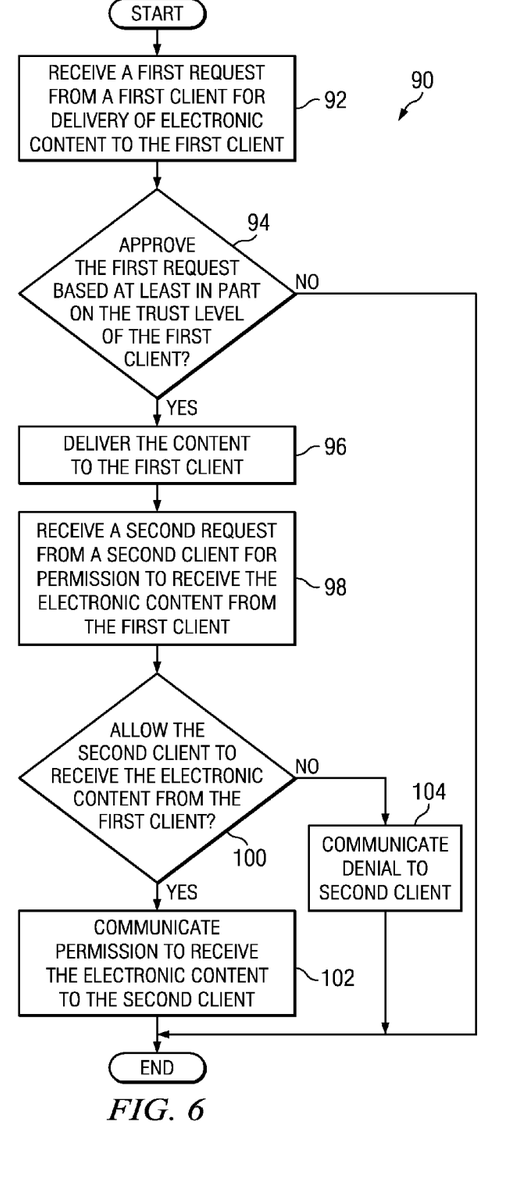
FIG. 6 illustrates a flow chart of an example method for sharing content between clients in a communication network, in accordance with certain embodiments of the present disclosure.

FIG. 6 illustrates a flow chart of an example method 90 for sharing content between clients 30 in a communication network 2, in accordance with certain embodiments of the present disclosure. Method 90 may be performed by a server 20, a PEP 23 associated with a server 20, a PDP 22 associated with a server 20, and/or another component, device, and/or feature of communication network 2. In the following section, method 90 may be described as if performed by PEP 23 and/or PDP 22 associated with server 20, but that description does not limit the application of the teachings of the present disclosure.

At step 92, PEP 23 may receive a first request from a first client 30a for delivery of electronic content to the first client 30a. PEP 23 may receive the first request over a VPN, the Internet, email, and/or any other appropriate communication link with first client 30a.

At step 94, PDP 22 may decide whether to approve the delivery of the electronic content to the first client 30a based at least in part on the trust level associated with the first client 30a. As described above, communication network 2 may include a trust-based hierarchy assigning various trust levels to clients 30, internal users, and/or other components and/or users of communication network 2. If PDP 22 determines that first client 30a is not approved, method 50 may end.

At step 96, PEP 23 may deliver the electronic content to first client 30a based on the permission granted by PDP 22. The electronic content may be delivered by any appropriate method.

At step 98, PEP 23 may receive a second request from second client 30b requesting permission to receive the electronic content directly from first client 30a. The second request may include any appropriate and/or required data related to first client 30a, second client 30b, or both. As discussed above, the data may include the trust level of each client, integrity information related to either or both, etc.

At step 100, PDP 22 may decide whether to grant permission for second client 30b to receive the requested electronic content directly from first client 30a. The decision may be based at least in part on the data included in the second request. For example, PDP 22 may base the decision at least in part on the trust level of first client 30a, the trust level of second client 30b and/or integrity information related to either client 30a or 30b. If PDP 22 determines the second request is not approved, method 90 may proceed to step 104.

At step 102, PEP 23 may communicate to second client 30b that second client 30b has permission to receive the requested electronic content from first client 30a. At the same time, PEP 23 and/or PDP 22 may impose one or more conditions on the delivery of the requested electronic content. For example, the use of the electronic content by second client 30b may be restricted. As another example, second client 30b may be granted a specific and/or limited number of times the electronic content may be accessed. As another example, second client 30b may be granted permission to access the requested electronic content only during a predefined period of time. As another example, second client 30b may be limited and/or prohibited from delivering the requested electronic content to other clients.

At step 104, PEP 23 may communicate to second client 30b that it does not have permission to receive the electronic content directly from first client 30a. The denial may include alternative sources for the delivery of the requested electronic content. For example, PEP 23 may suggest alternative sources and/or propose that second client 30b receive the requested electronic content directly from server 20.

Figure 7:
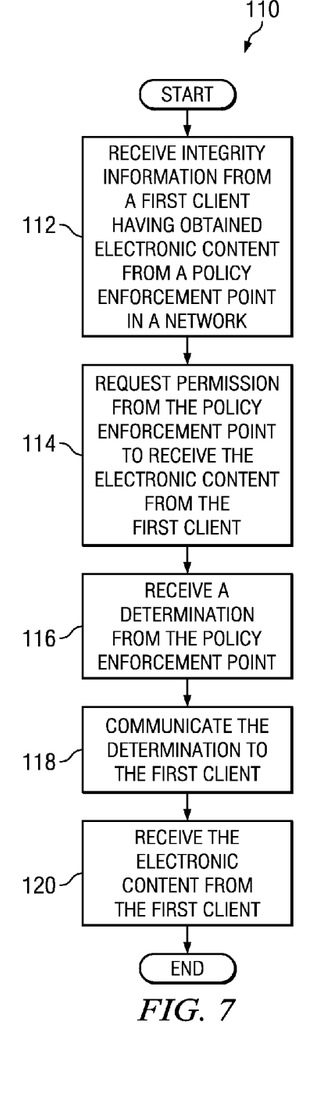
FIG. 7 illustrates a flow chart of an example method for sharing content between clients in a communication network, in accordance with certain embodiments of the present disclosure.

FIG. 7 illustrates a flow chart of an example method 110 for sharing content between clients 30 in a communication network 2, in accordance with certain embodiments of the present disclosure. Method 110 may be performed by a client 30, a server 20, and/or another component, device, and/or feature of communication network 2. In the following section, method 110 may be described as if performed by a second client 30b associated with communication network 2, but that description does not limit the application of the teachings of the present disclosure.

At step 112, second client 30b may receive integrity information from a first client 30a. First client 30a may provide the integrity information in response to a request from server 20 and/or second client 30b. Second client 30b may receive the information over a VPN, the Internet, email, and/or any other appropriate communication link with PEP 23. As discussed above, the integrity information may include the trust level of first client 30a. As another example, second client 30b may receive information related to electronic content that has been delivered to first client 30a from server 20.

At step 114, second client 30b may request permission from PEP 23 associated with server 20 to receive the electronic content directly from first client 30a. The request may include any appropriate and/or required data related to first client 30a and/or second client 30b. As discussed above, the data may include the trust level of first client 30a, the trust level of second client 30b, integrity information related to first client 30a, integrity information related to second client 30b, etc.

At step 116, second client 30b may receive a decision from PEP 23 regarding the second request. If the decision is no, method 110 may end. If the decision is yes, method 110 may proceed to step 118. At the same time, PEP 23 and/or PDP 22 may have imposed one or more conditions on the delivery of the requested electronic content. For example, the use of the electronic content by second client 30b may be restricted. As another example, second client 30b may be granted a specific and/or limited number of times the electronic content may be accessed. As another example, second client 30b may be granted permission to access the requested electronic content only during a predefined period of time. As another example, second client 30b may be limited and/or prohibited from delivering the requested electronic content to other clients.

At step 118, second client 30b may communicate the determination to first client 30a.

At step 120, second client 30b may receive the requested electronic content from first client 30a. The requested electronic content may be delivered by any appropriate method and/or system.

Although FIGS. 4-7 represent a particular number of steps to be taken with respect to methods 50, 70, 90, and 110, methods 50, 70, 90, and/or 110 may be executed with more or fewer steps than those depicted. Using the methods and systems disclosed herein, certain problems associated with maintaining secure access to electronic content may be improved, reduced, or eliminated. For example, the methods and system disclosed herein allow for distribution of electronic content without recurring use of the network connection directly to server 20 and/or storage unit 14.

Although the present invention has been described with several embodiments, various changes and modifications may be suggested to one skilled in the art. It is intended that the present invention encompass such changes and modifications as fall within the scope of the appended claims.

What is claimed is:

1. A method of sharing electronic content between clients at trust levels in a trust hierarchy associated with a network implementing policy-based management, the method comprising:
   receiving at a policy enforcement point of a server a first request from a first client for delivery of the electronic content to the first client at a trust level in the trust hierarchy, the trust hierarchy comprising at least two levels of trust allowing access to network resources, each progressively higher level in the trust hierarchy allowing additional access to the network resources, the network resources including at least the electronic content, the server being a separate device from the first client;
   approving the delivery of the electronic content to the first client at a policy enforcement point in the network based at least in part on the trust level of the first client in the trust hierarchy;
   delivering the electronic content to the first client;
   receiving at the policy enforcement point of the server a second request directly from, without traversing another client, a second client at a trust level in the trust hierarchy, for permission to receive the electronic content from the first client, the second request including integrity information about the first client, the trust level of the second client at least as trusted as the trust level of the first client;
   determining at least one limitation on use of the content by the second client, the at least one limitation comprising any one of accessing the content only during a predefined period of time, limiting delivery of the content to other clients, and prohibiting delivery of the content to the other clients;
   determining whether to allow the second client to receive the electronic content, with the at least one limitation, from the first client based at least in part on the integrity information about the first client and the trust level of the second client;
   communicating to the second client the determination of whether the second client may receive the electronic content from the first client;
   communicating, from the second client to the first client, the determination of whether the second client may receive the content from the first client;
   obtaining, by the second client, integrity information regarding the first client;
   verifying, by the second client, the integrity information regarding the first client; and
   requesting, by the second client, the content from the first client only after verifying the integrity information regarding the first client.

2. The method according to claim 1, further comprising the second client negotiating with the policy enforcement point for permission to receive the content from the first client.

3. The method according to claim 1, further comprising delivering the content from the first client to the second client.

4. The method according to claim 1, further comprising the second client obtaining integrity information regarding the first client.

5. The method according to claim 1, further comprising:
   the second client obtaining integrity information regarding the first client;
   the second client verifying the integrity information regarding the first client; and
   the second client requesting the content from the first client only after verifying the integrity information regarding the first client.

6. The method according to claim 1, further comprising the first client obtaining integrity information about the second client.

7. The method according to claim 1, further comprising:
   the first client obtaining integrity information about the second client; and
   the first client verifying the integrity information about the second client;
   wherein the first client delivers the content to the second client only after verifying the integrity information about the second client.

8. The method according to claim 1, wherein the first client is associated with a first entity and the second client is associated with a second entity.

* * * * *